(12) United States Patent
Smith et al.

(10) Patent No.: US 6,627,110 B1
(45) Date of Patent: Sep. 30, 2003

(54) HYDROGEN SULFIDE REMOVAL PROCESS

(75) Inventors: James W. Smith, Toronto (CA);
Silvano Meffe, Toronto (CA); Peter S. Walton, Etobicoke (CA); David T. R. Ellenor, Pickering (CA)

(73) Assignee: Apollo Environmental Systems Corp., Toronto (CA)

( * ) Notice: Subject to any disclaimer, the term of this patent is extended or adjusted under 35 U.S.C. 154(b) by 0 days.

(21) Appl. No.: 09/439,500

(22) Filed: Nov. 12, 1999

Related U.S. Application Data

(63) Continuation-in-part of application No. PCT/CA98/01051, filed on Nov. 12, 1998.
(60) Provisional application No. 60/065,287, filed on Nov. 12, 1997.

(51) Int. Cl.[7] ................................................. C09K 3/00
(52) U.S. Cl. ........................................ 252/184; 252/189
(58) Field of Search ............................... 252/184, 189; 423/242.1

(56) References Cited

U.S. PATENT DOCUMENTS

| | | | |
|---|---|---|---|
| 1,925,198 A | 9/1933 | Melvill | 423/573.1 |
| 2,043,084 A | 6/1936 | Ward et al. | 423/574.1 |
| 2,534,063 A | 12/1950 | Ross et al. | 423/574.1 |
| 4,124,685 A | 11/1978 | Tarhan et al. | 423/574.2 |
| 4,482,529 A | 11/1984 | Chen et al. | 423/243 |
| 4,592,905 A | 6/1986 | Plummer et al. | 423/573 |
| 4,855,124 A | 8/1989 | Matsuoka et al. | 423/574.1 |
| 4,976,935 A | 12/1990 | Lynn | 423/222 |
| 5,389,351 A | 2/1995 | Hasebe et al. | 423/576.7 |
| 5,556,606 A | 9/1996 | Khanmamedov | 423/228 |
| 5,705,135 A | 1/1998 | Deberry et al. | 423/224 |
| 6,096,280 A * | 8/2000 | Ellenor et al. | 423/242.1 |

FOREIGN PATENT DOCUMENTS

| | | |
|---|---|---|
| DE | 26 48 190 A1 | 4/1978 |
| DE | 36 07 029 A1 | 10/1986 |
| DE | 35 31 406 A1 | 3/1987 |
| EP | 0 346 218 A1 | 12/1989 |
| FR | 2 578 531 A1 | 9/1986 |
| WO | WO 97/18027 | 5/1997 |

OTHER PUBLICATIONS

Patent Abstracts of Japan vol. 001, No. 111 (C–027), Sep. 26, 1977 for JP 52 072384 A (Kawasaki Heavy Ind. Ltd.) Jun. 16, 1977, see abstract.

* cited by examiner

*Primary Examiner*—Cephia D. Toomer
(74) *Attorney, Agent, or Firm*—Sim & McBurney

(57) ABSTRACT

Hydrogen sulfide is removed from gas streams by reaction with sulfur dioxide to produce sulfur. The reaction is effected in a reaction medium comprising a non-aqueous Lewis base with a $pK_b$ value of about 6 to about 11. The reaction medium possesses a specific combination of properties:

a) absorbs sulfur dioxide and reacts chemically therewith, the reaction medium containing hydrogen sulfide, sulfur and water to form complex sulfur-oxide species, including sulfate and polythionate species, whereby the resulting solution exhibits no or an insignificant sulfur dioxide vapor pressure;

b) absorbs hydrogen sulfide;

c) removes the hydrogen sulfide from the gas stream through contact of the gas stream with the reaction medium in the presence of the complex sulfur-oxide species;

d) acts as a catalyst for the overall reaction of the hydrogen sulfide with sulfur dioxide to produce sulfur; and e) has the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium.

The reaction medium may be preloaded with sulfur dioxide, whereby the complex sulfur-oxide species are preformed in the reaction medium before contacting with the gas stream.

13 Claims, 4 Drawing Sheets

Direct Gas Sweetening - Continuous Process

Batch Gas Scavenging Process

HYDROGEN SULFIDE REMOVAL PROCESS

REFERENCE TO RELATED APPLICATION

This application is a continuation-in-part of PCT/CA98/01051 filed Nov. 12, 1998 and claims priority under 35 USC 119(e) from US Provisional Patent Application No. 60/065,287 filed Nov. 12, 1997.

FIELD OF INVENTION

The present invention relates to the removal of hydrogen sulfide from gas streams using a reaction medium comprising non-aqueous Lewis bases.

BACKGROUND TO THE INVENTION

Many reservoirs of natural gas contain hydrogen sulfide and carbon dioxide which are acid gases which can be extremely corrosive when combined with each other and water. Natural gas containing such acid or sour gases must be purified (or "sweetened") to remove or decrease the concentration of such gases prior to the purified natural gas ("sweet gas") being forwarded to consumer, industrial and other markets.

The most commonly-practised process technology for acid gas removal is the absorption of the acid gases from the natural gas stream by a regenerable absorbing solution in a gas processing plant. In such procedures, a regenerable absorbing solution is passed in countercurrent contact with the natural gas stream to absorb the $H_2S$ and $CO_2$, as well as other sulfur compounds, from the natural gas stream, thereby reducing their concentration in the natural gas stream and purifying the natural gas stream.

The acid gas laden solution then is regenerated by steam stripping at elevated temperature and the regenerated solution is cooled and recirculated back to the natural gas contacting stage. Acid gases stripped from the solution in the regeneration step are vented from the gas processing plant for further processing, including, in some cases by incineration to sulfur dioxide.

Chemicals that are commonly employed in such procedures include amines, esters and similar regenerable materials in which the acid gases may be absorbed. The most commonly-employed amines for this procedure include monoethanolamine (MEA), diethanolamine (DEA) and methyldiethanolamine (MDEA).

The present invention is concerned with a manner of processing sour natural gas streams.

SUMMARY OF THE INVENTION

The present invention provides novel procedures for treatment of hydrogen sulfide-containing gas streams. As described in more detail below, the process of the invention includes a step of reacting hydrogen sulfide and sulfur dioxide to form sulfur (sometimes termed the Claus reaction) in a reaction medium comprising a non-aqueous Lewis base, preferably quinoline. The processes described herein are applicable to other gas streams which contain hydrogen sulfide, including Claus process tail gas streams and industrial flue gas streams. One benefit of the present invention, as described below, is that there is no necessity to precisely control the stoichiometry of the gases for a complete removal of hydrogen sulfide to be effected.

In accordance with the present invention, a reaction medium comprising a non-aqueous Lewis base, having a $pK_b$ value of about 6 to about 11, preferably about 8 to about 10, particularly quinoline, is used to remove hydrogen sulfide from gas streams, particularly in the sweetening of sour natural gas streams but also for other applications, such as tail gas cleanup, by effecting reaction between hydrogen sulfide and sulfur dioxide in the reaction medium. The reaction of hydrogen sulfide with sulfur dioxide, which may be in the form of a reaction product with the Lewis base, proceeds in accordance with the equation:

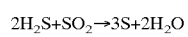

$$2H_2S + SO_2 \rightarrow 3S + 2H_2O$$

known as the Claus reaction.

It is well known that sulfur dioxide is soluble in many amines, including quinoline, forming an equi-molar solid reaction product, itself soluble in quinoline and quinoline-water mixtures. However, such material has a measurable sulfur dioxide vapor pressure which becomes significant at temperatures above about 50° C. and hence is unsuitable as a storage medium for sulfur dioxide, at least for low pressure applications.

The inventors herein have discovered, surprisingly and unexpectedly, that non-aqueous Lewis bases, in the presence of water, hydrogen sulfide and sulfur product and over time form non-aqueous Lewis base miscible components which have a storage capacity for sulfur dioxide and which do not exhibit any significant sulfur dioxide vapor pressure. The storage capacity of the solution enables the reaction of sulfur dioxide and hydrogen sulfide to be carried out without precise control of the input stoichiometry, providing a "flywheel" effect. This aspect of the invention is particularly important for tail gas cleanup, such as of Claus reaction tail gas streams, where variations in gas composition commonly occur.

The exact nature of the miscible components which are formed in the non-aqueous Lewis base are unknown but are complex sulfur-oxide species, including sulfate and polythionate species, and the term "complex sulfur-oxide species" is used herein to denote such miscible components. However, their effect is to provide a medium uniquely suited to remove hydrogen sulfide from a gas stream containing hydrogen sulfide by reaction with sulfur dioxide.

The inventors herein use the complex sulfur-oxide species in an original manner to provide improved procedures for removing hydrogen sulfide from gas streams. The present invention uses a reaction medium comprising a Lewis base which has $pK_b$ values from about 6 to about 11, preferably about 8 to about 10. Although strong Lewis bases, ($pK_b$ less than about 6) tend to react irreversibly with sulfur dioxide, preventing the Claus reaction from occurring, weaker Lewis bases ($pK_b$ greater than about 11) do not appear to catalyze the Claus reaction. The Lewis bases of intermediate basicity ($pK_b$ from about 6 to about 11), as used herein, react reversibly with sulfur dioxide and catalyze the Claus reaction. Quinoline ($pK_b$ 9) is the preferred Lewis base but other amines with the required $pK_b$ values can be used, such as 2,4,6-trimethyl pyridine ($pK_b$ 7). In addition, the Lewis bases may be used in diluted form with miscible liquids, such as glycols and N-methyl pyrrolidone ($pK_b$ 8 to 10).

One aspect of the present invention is directed specifically to scavenging hydrogen sulfide from gas streams, such as sour gases, on an intermittent or continuous basis, using a reaction medium which is a non-aqueous Lewis base "preloaded" with sulfur dioxide, but yet exhibits no significant sulfur dioxide vapor pressure, thereby providing a reservoir of reactant for the hydrogen sulfide. By contacting a gas stream containing hydrogen sulfide with the reaction medium, the hydrogen sulfide is absorbed and reacts with the pre-loaded sulfur dioxide at ambient temperature, about 50 to about 35° C., to produce solid sulfur and water, according to the Claus reaction.

In this procedure, the pre-loaded sulfur dioxide is not stripped from the reaction medium and yet is available for reaction with the hydrogen sulfide, enabling removal of hydrogen sulfide from sour gas down to below about 4 ppm in one pass through the reactor.

The pre-loaded sulfur dioxide is present in the reaction medium in the form of complex sulfur-oxide species, including sulfate and polythionate species, and it is those species which react with the hydrogen sulfide absorbed from the gas stream.

Accordingly, in one aspect of the present invention, there is provided a reaction medium for removing hydrogen sulfide from a gas stream, which comprises a non-aqueous Lewis base having a $pK_b$ value of about 6 to about 11 containing complex sulfur-oxide species, including sulfate and polythionate species and exhibiting no sulfur dioxide vapor pressure and having the capacity to absorb hydrogen sulfide form a gas stream and to react with absorbed hydrogen sulfide to produce sulfur and water.

The reaction medium which is provided in accordance with this aspect of the present invention is formed by reacting hydrogen sulfide with sulfur dioxide to form sulfur and water. A stoichiometric excess of sulfur dioxide reacts with the in-situ produced sulfur and water to form the complex sulfur-oxide species. This operation may be effected in two steps or a single step. The gas stream may contain hydrogen sulfide and sulfur dioxide in a mole ratio of 1:1 to about 1.2.

Accordingly, in a further aspect of the present invention, there is provided a process for forming a reaction medium useful for the removal of hydrogen sulfide from a gas stream, which comprises reacting hydrogen sulfide and sulfide dioxide in a non-aqueous Lewis base having a $pK_b$ value of about 6 to about 11 to form sulfur and water in accordance with the equation:

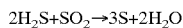

and, either subsequently or simultaneously, reacting sulfur dioxide in excess of the stoichiometry of the equation with said non-aqueous Lewis base, to provide a reaction medium containing complex sulfur-oxide species, including sulfate and polythionates.

The complex sulfur-oxide species also may be formed by adding oxygen to the medium instead of sulfur dioxide, under appropriate conditions of temperature and pressure.

In the case where the reaction with the stoichiometric excess of sulfur dioxide is effected subsequent to completion of the reaction of hydrogen sulfide and sulfur dioxide, the process may be effected by:

feeding a gas stream containing said hydrogen sulfide and sulfur dioxide through a body of said non-aqueous Lewis base to form sulfur and water in accordance with said stoichiometric equation until there is a significant and sufficient amount of elemental sulfur formed, and, subsequently feeding a gas stream containing sulfur dioxide to said body of Lewis base until a predetermined amount of sulfur dioxide has been added or there is a significant detectable amount of sulfur dioxide in the off-gas stream from the body of non-aqueous Lewis base.

In the case where the reaction with the stoichiometric excess of sulfur dioxide is effected simultaneously with the reaction of hydrogen sulfide and sulfur dioxide, the process may be effected by:

feeding a gas stream containing hydrogen sulfide and a stoichiometric excess of sulfur dioxide through a body of non-aqueous Lewis base until a predetermined amount of sulfur dioxide has been added or there is a significant detectable amount of sulfur dioxide in the off-gas stream from the body of non-aqueous Lewis base.

The novel reaction medium provided herein may be used to effect the removal of hydrogen sulfide from gas streams by absorption of the hydrogen sulfide from the gas stream and reaction of the absorbed hydrogen sulfide with the complex sulfur-oxide species. Based on the experimental results provided herein, a 4 ft. diameter gas-liquid contact column 20 ft. high, containing 1600 gallons of the reaction medium, is able to remove 1300 kg of hydrogen sulfide from sour gas before it is exhausted.

When the reaction medium is exhausted of the capacity to absorb hydrogen sulfide, the spent reaction medium may be regenerated in any convenient manner, for example, by reaction with sulfur dioxide or oxygen.

The reaction medium provided herein, pre-loaded with sulfur dioxide, has considerable benefits in hydrogen sulfide scavenging operations. Inexpensive sulfur dioxide, in the form of the complex sulfur-oxide species, is used as the scavenging agent, and the reaction medium has a high capacity for hydrogen sulfide removal, with up to 20 weight percent loadings of sulfur dioxide in the reaction medium.

The hydrogen sulfide removal process using the reaction medium may utilize a simple bubble column reactor and an ambient operating temperature, with minimal peripheral equipment, and have low capital costs. The simplicity of the hydrogen sulfide removal process makes it suitable for unattended wellhead operation, even in remote locations.

The reaction medium is readily loaded and unloaded from a bubble column and the potential exists for execution of the two operations simultaneously without a shutdown. The spent reaction medium is readily regenerated, which may be effected at a central processing facility, by adding more sulfur dioxide, as mentioned above. Such a central processing facility may serve a number of satellite wellhead sweetening operations, with recharged reaction medium being transported from the facility out to the sites and spent reaction medium being transported back to the central facility for regeneration. Since the sulfur dioxide is present in the reaction medium as complex sulfur-oxide species, the sulfur dioxide is not removed from the reaction medium by gas passing through the reaction medium and hence does not contaminate the sweetened gas.

Another aspect of the present invention provides a process for the removal of hydrogen sulfide from a gas stream by reaction with sulfur dioxide, which comprises effecting the reaction in a reaction medium comprising a non-aqueous Lewis base with a $pK_b$ value in the range of about 6 to about 11 and which reaction medium:

a) absorbs sulfur dioxide and reacts chemically therewith, the reaction medium containing water, hydrogen sulfide and sulfur to form complex sulfur-oxide species, including sulfate and polythionate species, whereby the resulting solution exhibits no or an insignificant sulfur dioxide vapor pressure;

b) absorbs hydrogen sulfide;

c) removes the hydrogen sulfide from the gas stream through contact of the gas stream with the reaction medium in the presence of the complex sulfur-oxide species;

d) acts as a catalyst for the overall reaction of the hydrogen sulfide with sulfur dioxide to produce sulfur; and (e) has the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium.

In accordance with the aspect of the invention described above, the reaction medium may be preloaded with sulfur dioxide, whereby the complex sulfur-oxide species are preformed in the reaction medium before contacting with the gas stream.

The reaction medium may consist essentially of the non-aqueous Lewis base or may further comprise a miscible diluent, including glycols, water and N-methyl-pyrrolidone.

The process of hydrogen sulfide removal provided herein may be effected in a manner in which sulfur dioxide is continuously absorbed by the reaction medium to react with hydrogen sulfide in the gas stream at a temperature of about 5° to about 155° C., preferably about 30° to about 130° C., to produce sulfur.

The sulfur which is formed in the process is completely miscible with the preferred Lewis base, quinoline, at temperatures above about 80° C. Removal and recovery of the sulfur may be achieved by operating a portion or the whole of the hydrogen sulfide removal operation at a temperature below this temperature. The recovered sulfur may be washed with hot water or suitable solvent, or subjected to an alternative procedure, to remove Lewis base.

The latter procedure is particularly useful in a natural gas sweetening operation or for the processing of a hydrogen sulfide-containing gas stream where a continuous operation is required.

The process of hydrogen sulfide removal provided herein may be effected in a manner in which the gas stream is so contacted, intermittently or continuously, with a body of the reaction medium to react the hydrogen sulfide with sulfur dioxide in the reaction medium in the presence of complex sulfur-oxide species to form sulfur until the reaction medium is depleted of its capacity to react with hydrogen sulfide and a significant hydrogen sulfide vapor pressure is present.

The latter procedure is particularly useful for scavenging operations to remove lesser amounts of hydrogen sulfide on an intermittent operational basis from gas streams having a variety of sources. The procedure may be operated at a temperature above or below the melting point of sulfur and down to the solidification point of the reaction medium. The sulfur usually is permitted to accumulate in the body of the reaction medium-until the reaction medium is depleted.

When the reaction medium becomes depleted of the ability to react with hydrogen sulfide, which may be detected by any conventional sensing device, the reaction medium is regenerated. Regeneration may take a variety of forms, including replacement of the depleted reaction medium by a fresh charge of the reaction medium containing complex sulfur-oxide species or a charge of reaction medium containing complex sulfur-oxide species regenerated from a previous batch. Sulfur may be removed intermittently as desired from the reaction medium using conventional technology.

By means of variations in the composition of the reaction medium, to include suitable amounts of glycol and water, and by the choice of a suitable temperature of operation, it may be possible to combine the removal of hydrogen sulfide with the simultaneous removal of carbon dioxide and water vapour from the gas stream.

GENERAL DESCRIPTION OF THE INVENTION

Figure 1:
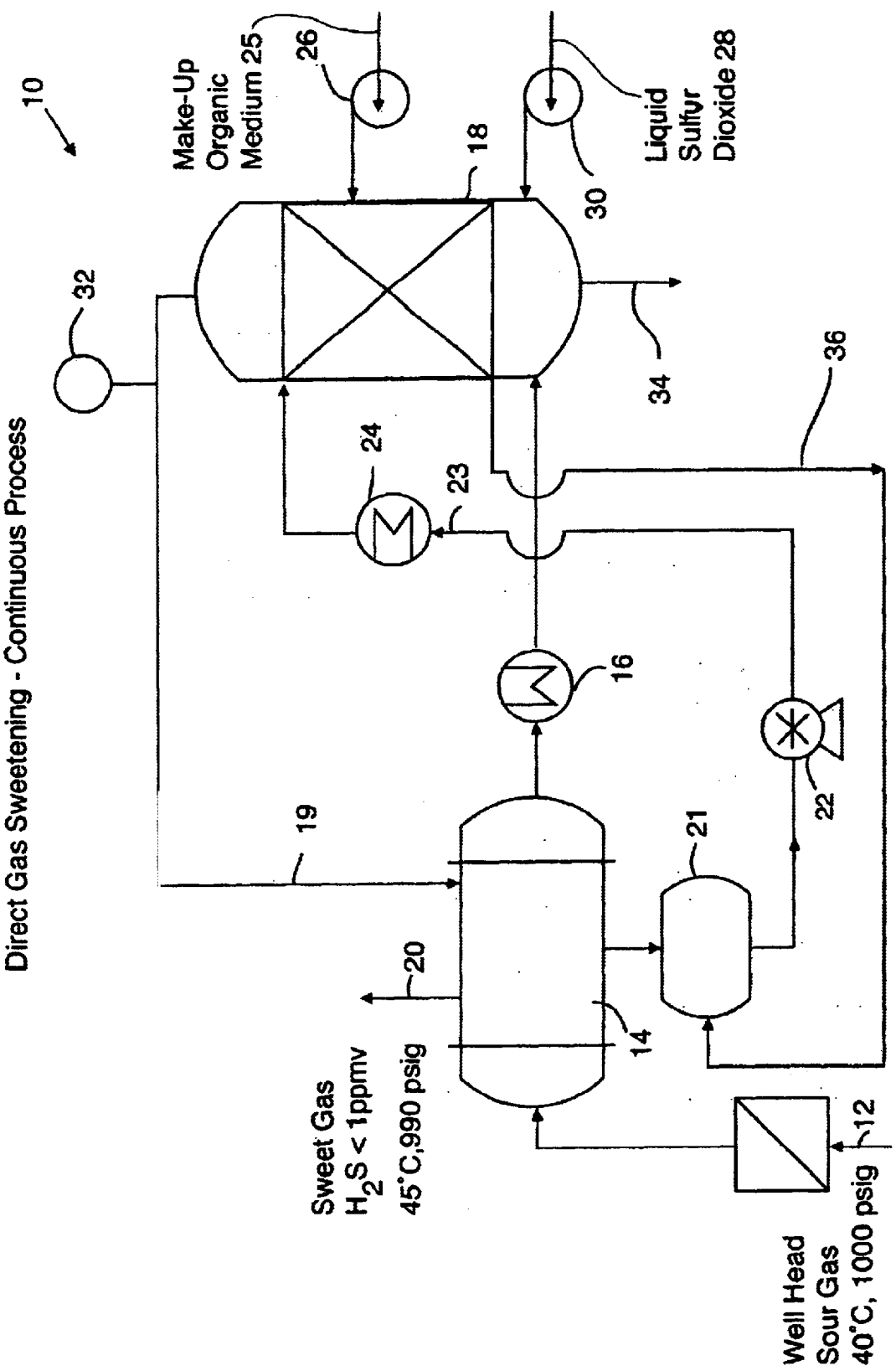
FIG. 1 is a schematic flow sheet of a continuous hydrogen sulfide removal process for sweetening a natural gas stream containing hydrogen sulfide under process conditions of operation which may vary widely, according to one embodiment of the invention.

In one specific aspect of the present invention, there is provided a continuous process for the removal of hydrogen sulfide from a gas stream, which comprises contacting a reaction medium with the gas stream in the presence of complex sulfur-oxide species, including sulfate and polythionate species, in the reaction medium to react with the hydrogen sulfide to form liquid sulfur, in accordance with the stoichiometric equation:

$$2H_2S+SO_2 \rightarrow 3S+2H_2O$$

in a reactor, the reaction medium containing the complex sulfur-oxide species and comprising a non-aqueous Lewis base having a $pK_b$ value of about 6 to about 11 having the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium; accumulating liquid sulfur from the reaction as a layer in a lower region of the reactor below the reaction medium, venting a hydrogen sulfide depleted gas stream from the reactor, and removing sulfur from the layer thereof.

In this procedure, the sulfur dioxide and/or the gas stream may be passed upwardly through the layer of sulfur to remove associated components from the sulfur and then through the reaction medium to produce therein the complex sulfur species for reaction with the hydrogen sulfide.

One specific embodiment of the procedure is carried out on a sour natural gas stream containing the hydrogen sulfide. In this specific procedure, the sour natural gas stream first is heated to a temperature at least close to and optionally above the melting point of the sulfur and then is passed to the reactor. The heated sour natural gas stream then is dispersed in the layer of liquid sulfur and is permitted to pass upwardly through the layer of liquid sulfur and into direct contact with the reaction medium containing sulfur dioxide in at least sufficient quantity to convert substantially all the hydrogen sulfide in the gas stream to sulfur.

The resultant sweetened gas stream is removed from the reactor as the vented gas stream. The sweetened gas stream is cooled to remove condensables therefrom and the resulting cooled sweetened gas stream is removed as the product of the process. The heating of the sour gas stream to the required temperature may be effected, at least in part, by passing the sour natural gas stream in heat exchange relationship with the removed sweetened gas stream, which thereby effects the cooling of the removed sweetened gas stream.

The condensables may be collected and comprise condensed non-aqueous Lewis base, associated compounds and dissolved sulfur and the collected condensables-may be recycled to the reactor or discarded. In addition, the reaction medium may be recycled within the reactor by blending a stream of the reaction medium from the reactor with the collected condensables and recycling the blend to the reactor. The blend may be heated prior to the passage to the reactor. The combined heating of the sour natural gas stream and the heating of the blend may provide the heating required to maintain the reaction temperature in the desired range above the melting point of sulfur.

In another specific aspect of the present invention, there is provided a process for the removal of hydrogen sulfide from a gas stream, which comprises passing the gas stream into a body of regenerable reaction medium comprising a non-aqueous Lewis base having a $pK_b$ value of about 6 to about 11 having the capacity to absorb sulfur dioxide in sufficient quantity to remove substantially all the hydrogen sulfide from the gas stream, notwithstanding short term variations in the stoichiometric balance between the hydrogen sulfide and the sulfur dioxide in the reaction medium, and containing complex sulfur-oxide species, including sulfate and polythionate species, to absorb the hydrogen sulfide from the gas stream and to react the absorbed hydrogen sulfide with sulfur dioxide from the complex sulfur species in accordance with the stoichiometric equation:

$$2H_2S+SO_2 \rightarrow 3S+2H_2O$$

to form product sulfur in a reactor, venting a hydrogen sulfide depleted gas stream from an upper portion of the reactor above the reaction medium and permitting the product sulfur to settle to a lower portion of the reactor.

The hydrogen sulfide-containing gas stream may be passed into the body of reaction medium by a gas distributor within the body of reaction medium to distribute the gas stream in the form of small bubbles adjacent to a lower end of the reactor. The procedure may be operated as a continuous process or in intermittent manner and is particularly useful for scavenging operations.

Exhaustion of the capacity of the body of reaction medium to absorb and convert hydrogen sulfide to sulfur may be detected in any convenient manner and the exhausted reaction medium then is replaced with regenerated reaction medium containing the complex sulfur-oxide species, or regenerated by the reaction of sulfur dioxide in the presence of sulfur and water until there is a detectable sulfur dioxide vapor pressure. Alternatively, predetermined amounts of sulfur dioxide may be added to form a required amount of the complex sulfur-oxide species to react with a predetermined quantity of hydrogen sulfide. Sulfur may be removed from the reaction medium as required.

The hydrogen sulfide gas stream may also contain other sulphurous gases, including carbonyl sulfide and/or carbon disulfide. These gases are catalytically converted to carbon dioxide, water, and hydrogen sulfide, the hydrogen sulfide being removed from the gas stream by reaction with complex sulfur-oxide species in the reaction medium, in accordance with the reactions described in copending U.S. patent application Ser. No. 09/043,844 filed Jul. 15, 1998, assigned to the assignee hereof and the disclosure of which is incorporated herein by reference, now U.S. Pat. 6,096,280.

At very high gas flow rates, it may prove convenient to use other gas-liquid contact means, such as venturi scrubbers and in-line pipe contactors, well known to those skilled in the art.

DESCRIPTION OF PREFERRED EMBODIMENTS

The applicants provide herein two distinct embodiments of the process for removal of hydrogen sulfide, described in more detail below in relation to FIGS. 1, 2 and 3. In one embodiment of the invention (FIGS. 1 and 2), there is provided a continuous process for sweetening a natural gas stream containing hydrogen sulfide. In a second embodiment of the invention (FIG. 3), there is provided a batch process for sweetening natural gas, solution gas or other hydrogen sulfide contaminated industrial gas stream which utilizes regenerable quinoline-sulfur dioxide solutions.

A. Embodiment of FIG. 1:

Referring to FIG. 1, there is shown therein a single vessel continuous hydrogen sulfide removal process 10 which is carried out on a sour natural gas stream. Typical well-head gas conditions, concentration, temperature and pressure are given, but the process is applicable to a wide range of process conditions, as will be appreciated by those skilled in the art.

Natural gas flows from a well-head 12 through standard process equipment (not shown) to a heat exchanger 14, wherein it is heated to, say, about 116° C., and from there then flows to a gas heater 16, possibly gas fired, which further increases the gas temperature to, say, about 121° C., and preferably high enough to maintain the temperature of a reactor/contactor 18 to which the heated gas stream is fed above the melting point of sulfur. The gas stream enters reactor/contactor 18 through a check valve, not shown, which prevents the back-flow of gas and the contents of reactor/contactor 18.

In the reactor/contactor 18, which may be a bubble-column or packed column, the gas stream is in direct contact with a solution of liquid sulfur in a reaction medium comprising quinoline which contains sufficient sulfur dioxide in all forms to convert the hydrogen sulfide in the gas stream to sulfur by the Claus reaction referred to above.

The sweetened gas then passes by line 19 in counter current flow to the inlet gas through the shell side of heat exchanger 14, where the gas temperature is reduced to, say, about 5° C. above the well-head temperature. Alternatively, where larger quantities of water are involved, a quinoline-water separation may be effected. These procedures ensure that water produced in the Claus reaction is removed. This step is important, since it has been found according to the data of Table 1, that significant amounts of dissolved water may have a deleterious effect of the efficacy of the liquid Claus reaction in the reaction medium.

Sweet gas, which may have the indicated parameters, is discharged from the heat exchanger 14 by line 20.

Condensate formed in the shell side of the heat exchanger 14, which consists of quinoline, associated compounds and dissolved sulfur (which is moderately soluble in quinoline), and in some applications also including water, flows into tank 21. This step carries out the important function of preventing the deposition of condensed sulfur vapour on the heat exchanger tubes. Pump 22 then transfers the condensate back by the line 23 to the reactor/contactor 18 through a check valve, 20 not shown, which prevents back-flow. The recycle stream 23 may be heated by heat exchanger 24 to provide heat to the reactor/contactor 18 along with the heated gas stream heated in heat exchanger 16. The pump 22 operates continuously at a constant rate. Reaction medium make up 25 is required, since the exiting gas is saturated at a temperature of, say, 45° C. In view of this, it is desirable to operate with as low an approach temperature in heat exchanger 14 as economically feasible. Nevertheless, the vapour pressure of quinoline at temperatures less than 50° C. is only 0.00145 psi, and, at a total pressure of about 1000 psi, this corresponds to a concentration of 1.45 ppm(v). At a gas flow rate of 5 MMSCFD, the make up requirement for quinoline is about 1 kg/day.

Make up reaction medium 25 may be pumped from a tank through a check valve (not shown) by a level controlled pump 26 between appropriate levels of reaction medium in the reactor/contactor 18.

Liquid sulfur dioxide 28 is pumped continuously from a rail car or other available source by pump 30 at the required stoichiometric rate. Small variations in the stoichiometry, however, can be tolerated, as discussed above.

Sulfur formed in the reactor is in solution with quinoline in the reactor/contactor 18 and is discharged intermittently as required or continuously, by line 34.

The sulfur may be recovered from the quinoline/sulfur solution by cooling the solution to cause precipitation of sulfur and washing the sulfur with water or a suitable solvent to recover residual quinoline. Alternatively, addition of N-methyl pyrrolidone causes phase separation of sulfur and quinoline.

Reaction medium may be removed from a lower region of the reactor/contactor 18 by line 36 and recycled to the tank 21 to blend with the condensed materials therein and forms part of the stream recycled to the reactor/contactor 18 in line 23.

Although the embodiment discussed above with reference to FIG. 1 is preferably operated at temperatures in the reactor/contactor 18 of greater than 120° C., the reaction may be carried out at lower temperatures, and up to about 155° C., although vaporization of quinoline (or other non-aqueous Lewis base) is at a much higher rate at the higher temperatures due to the increase in vapour pressure. In general, the Claus reaction process in the reactor/contactor 18 is carried out at a temperature of about 120° to about 155° C., preferably about 120° to about 130° C.

Figure 2:
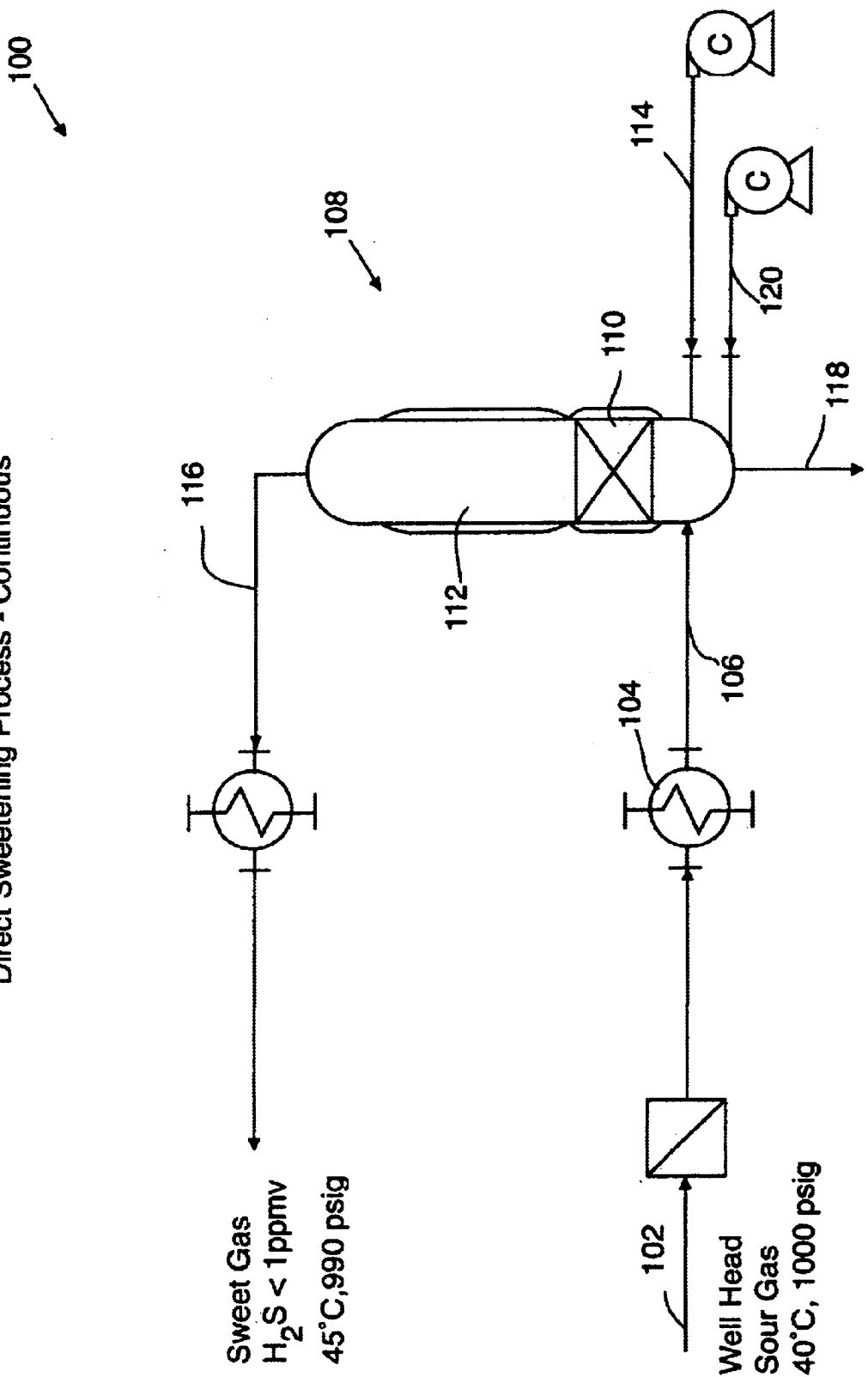
FIG. 2 is a schematic flow sheet of a continuous hydrogen sulfide removal process for sweetening of a natural gas stream containing hydrogen sulfide according to a second embodiment of the invention.

B. Embodiment of FIG. 2:

Referring to FIG. 2, there is shown an alternative procedure 100 to that used in FIG. 1, for the sweetening of a sour gas stream.

Natural gas flows from a well head 102 to a heat-exchanger 104. Typical well-head gas conditions of temperature and pressure are given, but the process is applicable to a wide range of process condition. The gas stream is heated or cooled to the desired reaction temperature and forwarded by the 106 to a reactor/contactor 108.

The reactor/contactor 108, which may be a bubble column and/or packed column or other gas-liquid contactor, is arranged with two reaction zones, a lower zone 110 operating at a temperature above the melting point of sulfur and an upper zone 112 operating below the melting point of sulfur. In the reactor/contactor 108, the gas stream first passes through a mass of sulfur and quinoline in the lower zone 110 along with sulfur dioxide fed by line 114 from any suitable source and then up into the upper zone 112. In the reactor-contactor 108 there is sufficient sulfur dioxide in all forms to convert hydrogen sulfide in the gas stream to sulfur by the Claus reaction referred to above.

The hydrogen sulfide depleted gas stream is discharged from the reactor/contactor 108 by line 116. Sulfur product is removed by line 118 and processed to recover entrained quinoline. Make-up quantities of quinoline are fed, as required, by line 120 to the reactor/contactor 108.

The procedure effected according to FIG. 2, employing the two zones, is beneficial in reducing quinoline losses, improving the removal efficiency with respect to hydrogen sulfide, and increasing the concentration of the complex sulfur species, which tend to be more stable at lower temperatures.

Figure 3:
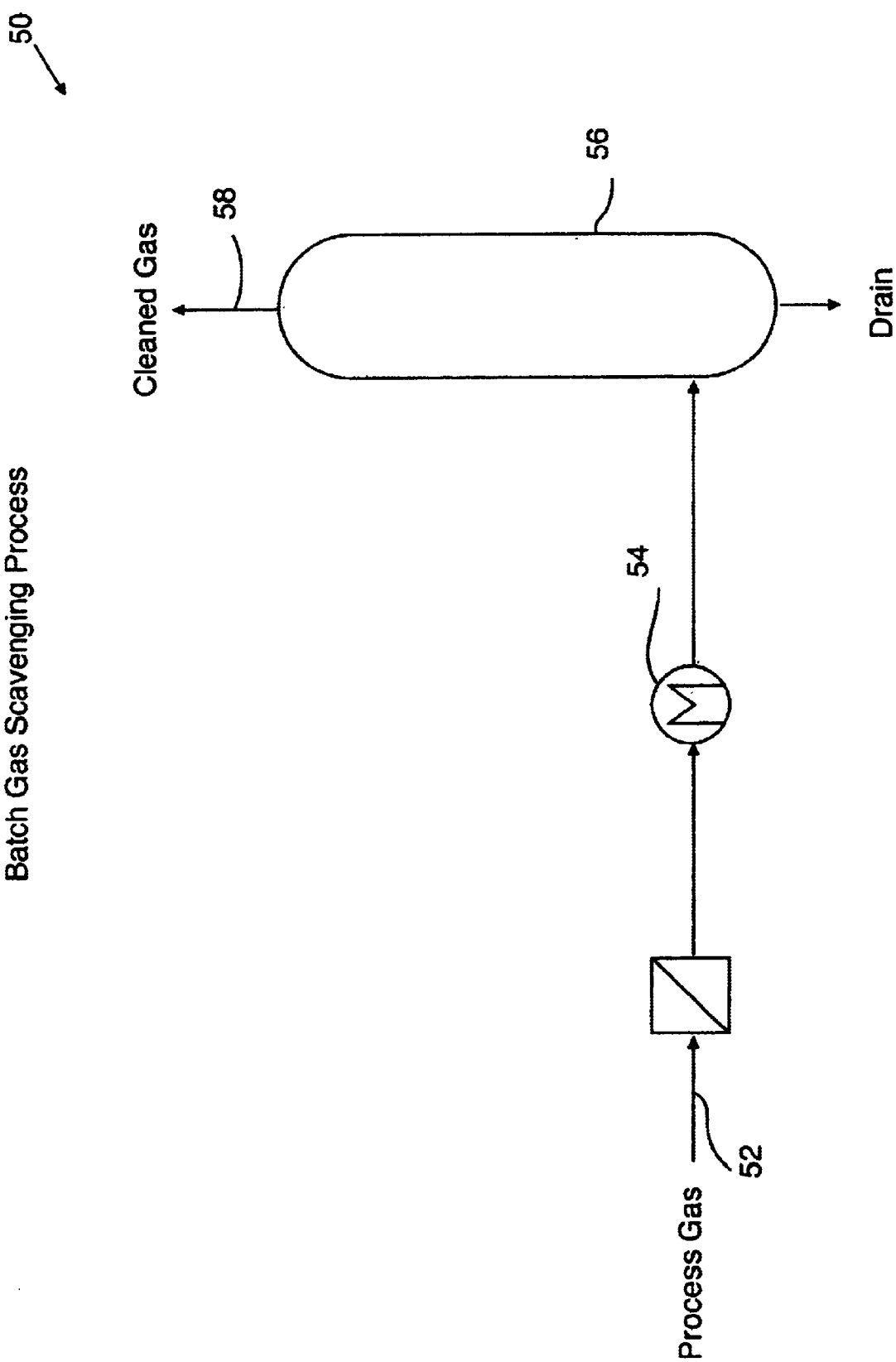
FIG. 3 is a schematic flow sheet of a batch scavenging process for the removal of hydrogen sulfide from a gas stream containing small amounts of hydrogen sulfide.

C. Embodiment of FIG. 3:

Referring to FIG. 3, there is shown therein a batch scavenging process 50 which is carried out on a variety of hydrogen sulfide-containing gas streams to remove residual amounts of hydrogen sulfide in a regenerable system.

Typically, known batch scavenging processes are either regenerable or non-regenerable. A number of commercial processes rely on regenerable oxides, such as zinc oxide, which are often returned to the supplier for a credit. Such systems are often used when the residual hydrogen sulfide must be less than a few ppb(v) and are very expensive. Other systems utilize a non-regenerable absorbent, which can be a solution of chemicals, such as aqueous sodium hydroxide or sodium hypochlorite. The cost of such processes can be very high, and disposal of the spent chemical solutions can be expensive and difficult. The commercial Sulfatreat process utilizes a non-regenerable iron compound. Like all non-regenerable batch scavenging processes, operating costs for this system can be very high when there is a substantial amount of hydrogen sulfide in the gas. The main economic advantage of the process according to this embodiment of the invention lies in the high capacity for hydrogen sulfide relative to other processes, and the simplicity and ease of regeneration of the absorbing solution, which, once again, relies on the liquid Claus reaction in reaction media comprising non-aqueous Lewis bases, such as quinoline.

Referring now to FIG. 3, an industrial gas stream 52 which may be natural gas, solution gas or other industrial gas, is passed through a heater 54, which is optional. A heater may be necessary if the gas stream is saturated and/or contains water mist, since dissolved water inhibits the process in quinoline, as mentioned above.

The optionally-heated gas flows through a shut-off valve, (not shown) to a gas distributor within an absorption/reaction vessel 56.The gas is distributed in the form of small bubbles by a distributor plate in the lower part of the vessel 56.Vessel 56 contains a non-aqueous Lewis base, preferably quinoline, containing complex sulfur-oxide species. Hydrogen sulfide is absorbed by the solution and reacts with the sulfur dioxide contained therein in the form of the complex sulfur-oxide species, producing more sulfur and water. The form in which the sulfur is obtained depends on the temperature of operation of the process. The sulfur agglomerates and settles to the bottom of the vessel. The treated gas, depleted of hydrogen sulfide, flows through a mist eliminator (not shown) and through shut-off valve (not shown) as cleaned gas 58. The sulfur dioxide remains dissolved in the solution in the form of the complex sulfur-oxide species and-hence is not vented from the vessel 56 with the cleaned gas.

The contact of the gas stream with the reaction medium also removes particulate matter, including condensed vapours, which may remain in solution or may be adsorbed on the sulfur. When the system is exhausted of its capacity to absorb hydrogen sulfide, which may be detected in any suitable manner, such as a hydrogen sulfide detector 32 as used in FIG. 1, the entire equipment, including vessel 56 and associated valves, may be taken out of service, and replaced by an identical, freshly regenerated system. The exhausted system may then be capped and sent to a central regeneration facility. Alternatively, the contents may be removed from the vessel 56 and replaced by a freshly regenerated solution, or may be regenerated in situ, using sulfur dioxide or oxygen, under suitable conditions of temperature and pressure.

At the regeneration facility, sulfur and the reaction medium may be separated by conventional technology, and, if desired, the sulfur can be further processed to remove other impurities.

The economic advantages of this process are substantial, having regard to its simplicity, its absorption capacity for sulfur dioxide, its fully regenerable chemistry and low reagent losses.

EXAMPLES

Example 1

This Example illustrates the removal of hydrogen sulfide and sulfur dioxide from gas streams using non-aqueous Lewis bases.

Experiments were performed in a glass sparged vessel with an inside diameter of 45 mm and a height of 380 mm. A 6 mm diameter tube extending inside the vessel from the top down to 30 mm from the vessel bottom was employed for introduction of the gas mixtures into the liquid content of the vessel. Attached to the bottom of this glass tube was a frit that dispersed the gas phase as fine bubbles into the liquid phase. A 6 mm diameter glass tube located on the top perimeter of the vessel permitted venting of the contact gases.

The results obtained at ambient temperature and atmospheric pressure are summarized in the following Tables I, II and III below.

TABLE I

Effect of Water on the Kinetics of the Claus Reaction quinoline

| VARIABLE | CONTROL | EXPT. 1 | EXPT. 2 |
|---|---|---|---|
| Quinoline (Vol %) | 100 | 95 | 80 |
| Water (Vol %) | 0 | 5 | 20 |
| $H_2S$ In (Vol %) | 2.37 | 2.18 | 2.78 |
| $SO_2$ In (Vol %) | 1.46 | 0.91 | 1.51 |
| $H_2S$ Out (Vol %) | 0.1 | 0.39 | 1.14 |
| $SO_2$ Out (Vol %) | 0.0 | 0.0 | 0.0 |
| Removal Efficiency $H_2S$ (%) | 96 | 82 | 59 |
| Removal Efficiency $SO_2$ (%) | 100 | 100 | 100 |

With respect to the results set forth in Table I, it can be seen that the presence of 5 volume percent of water in the quinoline does not affect the reaction kinetics or the stoichiometry of the $H_2S$ removal, but that the presence of 20 volume percent of water dramatically reduces the $H_2S$ removal, probably as a result of $SO_2$ reacting with the water at the same time as with the $H_2S$.

TABLE II

| TEST | LIQUID PHASE (0.04 $DM^3$) | FEED GAS RATE ($DM^3$/MIN) | FEED $H_2S$ (VOL %) | FEED $SO_2$ (VOL %) | FEED $CO_2$ (VOL %) | FEED $N_2$ (VOL %) | $H_2S$ REMOVAL (%) | $SO_2$ REMOVAL (%) | INPUT STOICHI-OMETRY |
|---|---|---|---|---|---|---|---|---|---|
| 1 | Quinoline | 0.5 | 3.26 | 1.43 | 0 | Balance | 100 | 99.3 | 2.3 |
| 2 | 2,4,6, Trimethyl pyridine | 0.5 | 2.74 | 1.24 | 0 | Balance | 100 | 92.7 | 2.2 |
| 3 | 2,4,6, Trimethyl pyridine | 0.5 | 1.13 | 0.82 | 0 | Balance | 100 | 79.3 | 1.4 |
| 4 | Quinoline | 0.5 | 1.44 | 0.68 | 41 | Balance | 81 | 100 | 2.1 |
| 5 | Quinoline | 0.5 | 0.58 | 0.22 | 27 | Balance | 69 | 100 | 2.6 |
| 6 | Quinoline | 0.5 | 2.69 | 1.29 | 0 | Balance | 100 | 99.4 | 2.1 |
| 7 | Quinoline | 1 | 2.03 | 1.48 | 0 | Balance | 100 | 98.7 | 1.4 |

With respect to the results set forth in Table II, the following observations can be made:

the results of tests 1, 2, 3, 6, and 7 sulfide can be achieved in the reaction medium;

(ii) the results of tests 1, 2, and 6 also indicate (for stoichiometries greater than 2:1) some absorptive capacity of the reaction medium for hydrogen sulfide;

(iii) the results of tests 3 and 7 indicate (for stoichiometries less than 2:1) a significant absorptive capacity of the reaction medium for sulfur dioxide;

(iv) the results of tests 4 and 5 indicate that the presence of carbon dioxide in the feed gas may inhibit the absorption of hydrogen sulfide.

In the experiments reported in Table III below, the gas impinger was packed with glass beads, the experiments were run at 25° C. and at a gas flow of 500 mL/min and the reagent volume was 175 ml. Each subsequent test was performed with the quinoline solution from the preceding test. Accordingly, since the quinoline solution in tests 1 to 3 effected catalyzed Claus reaction, the solution contained reaction product sulfur and possibly other stable sulfur oxide species, such as sulfate and tetrathionate.

TABLE III

| TEST | 1 | 2 | 3 | 4 | 5 | 6 | 7 |
|---|---|---|---|---|---|---|---|
| RUN DURATION (HR) | 2 | 2 | 2.5 | 1.5 | 2.5 | 1 | 1.5 |
| $H_2S$ IN (%) | 3.26 | 2.85 | 1.27 | 0.34 | 0 | 0 | 10.9 |
| $H_2S$ OUT (%) | 0 | 0 | 0 | 0 | 0 | 0 | 0 |
| $SO_2$ IN (%) | 1.43 | 1.44 | 0.36 | 0.27 | 60 | 0 | 0 |
| $SO_2$ OUT (%) | 0.01 | 0.05 | 0.02 | 0.03 | 0 | 0 | 0 |
| INPUT GAS RATIO $H_2S/SO_2$ | 2.28 | 1.98 | 3.52 | 1.26 | N/A | N/A | N/A |
| REMOVAL EFFICIENCIES (%) | | | | | | | |
| $H_2S$ | 100 | 100 | 100 | 100 | — | — | 100 |
| $SO_2$ | 99 | 97 | 94 | 89 | 100 | — | — |

As may be seen from these results, absorption of sulfur dioxide in quinoline is substantially complete in the presence of freshly-precipitated sulfur and water (Test 5). The reaction medium which is formed by the addition of substantial quantities of sulfur dioxide (as in Test 5), emits essentially no $H_2S$ or $SO_2$ when sparged with nitrogen (Test 6). The reaction medium is able to remove substantially all hydrogen sulfide from a gas stream containing 10.9% $H_2S$ (Test 7). Accordingly, a quinoline solution containing dissolved $SO_2$ and elemental sulfur, is able to scavenge hydrogen sulfide from a gas stream without sulfur dioxide being released from the solution.

Example 2

This Example illustrates the removal of hydrogen sulfide and sulfur dioxide from gas streams in an extended run.

An extended run was undertaken in a 3 inch diameter bubble column reactor containing 36 inches of ⅜ inch glass packing and filled with quinoline. Hydrogen sulfide and sulfur dioxide were introduced to the bottom of the reactor in a nitrogen carrier gas and passed upwards through the organic medium. The bubble column reactor was operated at 55° C. and input $H_2S$ concentrations ranging from 0.9 mole percent to 3.5 mole percent, with the appropriate input $SO_2$ concentration. The results obtained are set forth in Table IV below:

TABLE IV

EXTENDED RUN RESULTS

| DATE | PERIOD | TIME | TEMP °C. | PRESS psig | [INPUT GAS](mole %) | | | [OUTPUT GAS](mole %) | | REMOVAL EFF (%) | | INPUT RATIO | REMOVAL RATIO |
|---|---|---|---|---|---|---|---|---|---|---|---|---|---|
| | | | | | H2S | SO2 | N2 | H2S | SO2 | H2S | SO2 | | |
| May 19, 1999 | 1 | 11.00 | 55.00 | 22.00 | 0.950 | 0.680 | 101,160 | 0.001 | 0.002 | 99.95 | 99.75 | 1.40 | 1.40 |
| | 2 | 12.00 | 55.00 | 22.00 | 0.900 | 0.680 | 101,000 | 0.000 | 0.010 | 100.00 | 98.54 | 1.32 | 1.34 |
| | 3 | 13.00 | 55.00 | 22.00 | 0.840 | 0.410 | 102,560 | 0.000 | 0.012 | 100.00 | 97.16 | 2.05 | 2.11 |
| | 4 | 14.00 | 55.00 | 22.00 | 0.930 | 1.000 | 101,730 | 0.000 | 0.012 | 100.00 | 98.83 | 0.93 | 0.94 |
| | 5 | 15.00 | 55.00 | 22.00 | 0.910 | 0.610 | 101,790 | 0.000 | 0.015 | 99.99 | 97.50 | 1.49 | 1.53 |
| | 6 | 16.00 | 55.00 | 22.00 | 0.920 | 0.620 | 102,250 | 0.000 | 0.015 | 99.99 | 97.54 | 1.48 | 1.52 |
| | 7 | 17.00 | 55.00 | 22.00 | 1.090 | 0.660 | 101,820 | 0.000 | 0.015 | 99.99 | 97.69 | 1.65 | 1.69 |
| | 8 | 18.00 | 55.00 | 22.00 | 0.960 | 0.620 | 102,160 | 0.000 | 0.012 | 99.99 | 98.03 | 1.55 | 1.58 |
| | 9 | 19.00 | 55.00 | 22.00 | 0.960 | 0.620 | 101,850 | 0.000 | 0.012 | 99.99 | 98.03 | 1.55 | 1.58 |
| | 10 | 20.00 | 55.00 | 22.00 | 0.990 | 0.630 | 101,580 | 0.000 | 0.010 | 99.99 | 98.39 | 1.57 | 1.60 |
| | 11 | 21.00 | 55.00 | 22.00 | 1.070 | 0.630 | 100,970 | 0.000 | 0.010 | 99.99 | 98.39 | 1.70 | 1.73 |
| | 12 | 23.00 | 55.00 | 22.00 | 1.250 | 0.610 | 100,610 | 0.000 | 0.004 | 99.99 | 99.27 | 2.05 | 2.06 |
| | 13 | 24.00 | 55.00 | 22.00 | 1.310 | 0.630 | 100,470 | 0.000 | 0.006 | 99.98 | 98.98 | 2.08 | 2.10 |
| May 19, 1999 | 14 | 1.00 | 55.00 | 22.00 | 1.240 | 0.620 | 100,300 | 0.000 | 0.003 | 99.98 | 99.54 | 2.00 | 2.01 |
| | 15 | 2.00 | 55.00 | 22.00 | 1.390 | 0.660 | 100,680 | 0.000 | 0.004 | 99.97 | 99.38 | 2.11 | 2.12 |
| | 16 | 3.00 | 55.00 | 22.00 | 1.300 | 0.610 | 100,000 | 0.000 | 0.003 | 100.00 | 99.50 | 2.13 | 2.14 |
| | 17 | 4.00 | 55.00 | 22.00 | 1.350 | 0.620 | 100,670 | 0.000 | 0.003 | 99.98 | 99.51 | 2.18 | 2.19 |
| | 18 | 5.00 | 55.00 | 22.00 | 1.470 | 0.580 | 100,310 | 0.001 | 0.002 | 99.97 | 99.65 | 2.53 | 2.54 |
| | 19 | 6.00 | 55.00 | 22.00 | 1.440 | 0.580 | 99,560 | 0.001 | 0.001 | 99.96 | 99.82 | 2.48 | 2.49 |
| | 20 | 7.00 | 55.00 | 22.00 | 1.320 | 0.590 | 99,660 | 0.001 | 0.000 | 99.95 | 99.93 | 2.24 | 2.24 |
| | 21 | 8.00 | 55.00 | 22.00 | 1.420 | 0.560 | 98,020 | 0.002 | 0.000 | 99.89 | 99.96 | 2.54 | 2.53 |
| | 22 | 9.00 | 55.00 | 22.00 | 1.180 | 0.570 | 97,430 | 0.001 | 0.000 | 99.96 | 99.98 | 2.07 | 2.07 |
| | 23 | 10.00 | 55.00 | 22.00 | 1.020 | 0.530 | 97,510 | 0.001 | 0.000 | 99.93 | 99.98 | 1.92 | 1.92 |
| | 24 | 11.00 | 55.00 | 2.203 | 3.830 | 0.840 | 96,100 | 0.001 | 0.000 | 99.98 | 99.98 | 4.56 | 4.56 |
| | 25 | 12.00 | 55.00 | 22.00 | 3.780 | 1.630 | 95,720 | 0.650 | 0.000 | 81.95 | 100.00 | 2.32 | 1.90 |
| | 26 | 13.00 | 55.00 | 22.00 | 3.120 | 1.720 | 95,640 | 0.002 | 0.000 | 99.93 | 100.00 | 1.81 | 1.81 |
| | 28 | 14.00 | 55.00 | 22.00 | 3.390 | 1.800 | 95,790 | 0.004 | 0.000 | 99.89 | 100.00 | 1.88 | 1.88 |
| | 29 | 15.00 | 55.00 | 22.00 | 3.470 | 1.730 | 96,430 | 0.002 | 0.000 | 99.95 | 100.00 | 2.01 | 2.00 |
| | 31 | 16.00 | 55.00 | 22.00 | 3.530 | 1.790 | 96,930 | 0.002 | 0.000 | 99.94 | 100.00 | 1.97 | 1.97 |
| | 33 | 17.00 | 55.00 | 22.00 | 3.550 | 1.810 | 97,000 | 0.002 | 0.000 | 99.94 | 100.00 | 1.96 | 1.96 |
| | 34 | 18.00 | 55.00 | 22.00 | 3.410 | 1.730 | 95,410 | 0.002 | 0.000 | 99.95 | 100.00 | 1.97 | 1.97 |
| | 35 | 19.00 | 55.00 | 22.00 | 3.500 | 1.870 | 96,490 | 0.001 | 0.000 | 99.97 | 100.00 | 1.87 | 1.87 |
| | 36 | 20.00 | 55.00 | 22.00 | 3.420 | 1.840 | 97,190 | 0.002 | 0.000 | 99.95 | 99.99 | 1.86 | 1.86 |
| | 37 | 21.00 | 55.00 | 22.00 | 3.430 | 1.820 | 97,600 | 0.001 | 0.000 | 99.97 | 100.00 | 1.88 | 1.88 |
| | 38 | 22.00 | 55.00 | 22.00 | 3.470 | 1.830 | 97,450 | 0.001 | 0.000 | 99.98 | 99.99 | 1.90 | 1.90 |
| | 39 | 23.00 | 55.00 | 22.00 | 3.510 | 1.820 | 97,620 | 0.001 | 0.000 | 99.96 | 99.99 | 1.93 | 1.93 |
| | 40 | 24.00 | 55.00 | 22.00 | 3.490 | 1.570 | 96,990 | 0.002 | 0.000 | 99.95 | 100.00 | 2.22 | 2.22 |

TABLE IV-continued

EXTENDED RUN RESULTS

| DATE | PERIOD | TIME | TEMP °C. | PRESS psig | [INPUT GAS](mole %) H2S | [INPUT GAS](mole %) SO2 | [INPUT GAS](mole %) N2 | [OUTPUT GAS](mole %) H2S | [OUTPUT GAS](mole %) SO2 | REMOVAL EFF (%) H2S | REMOVAL EFF (%) SO2 | INPUT RATIO | REMOVAL RATIO |
|---|---|---|---|---|---|---|---|---|---|---|---|---|---|
| May 20, 1999 | 41 | 1.00 | 55.00 | 22.00 | 3.530 | 1.710 | 96,880 | 0.002 | 0.000 | 99.95 | 100.00 | 2.06 | 2.06 |
|  | 42 | 2.00 | 55.00 | 22.00 | 3.520 | 1.820 | 97,480 | 0.003 | 0.000 | 99.93 | 100.00 | 1.93 | 1.93 |

Figure 4:
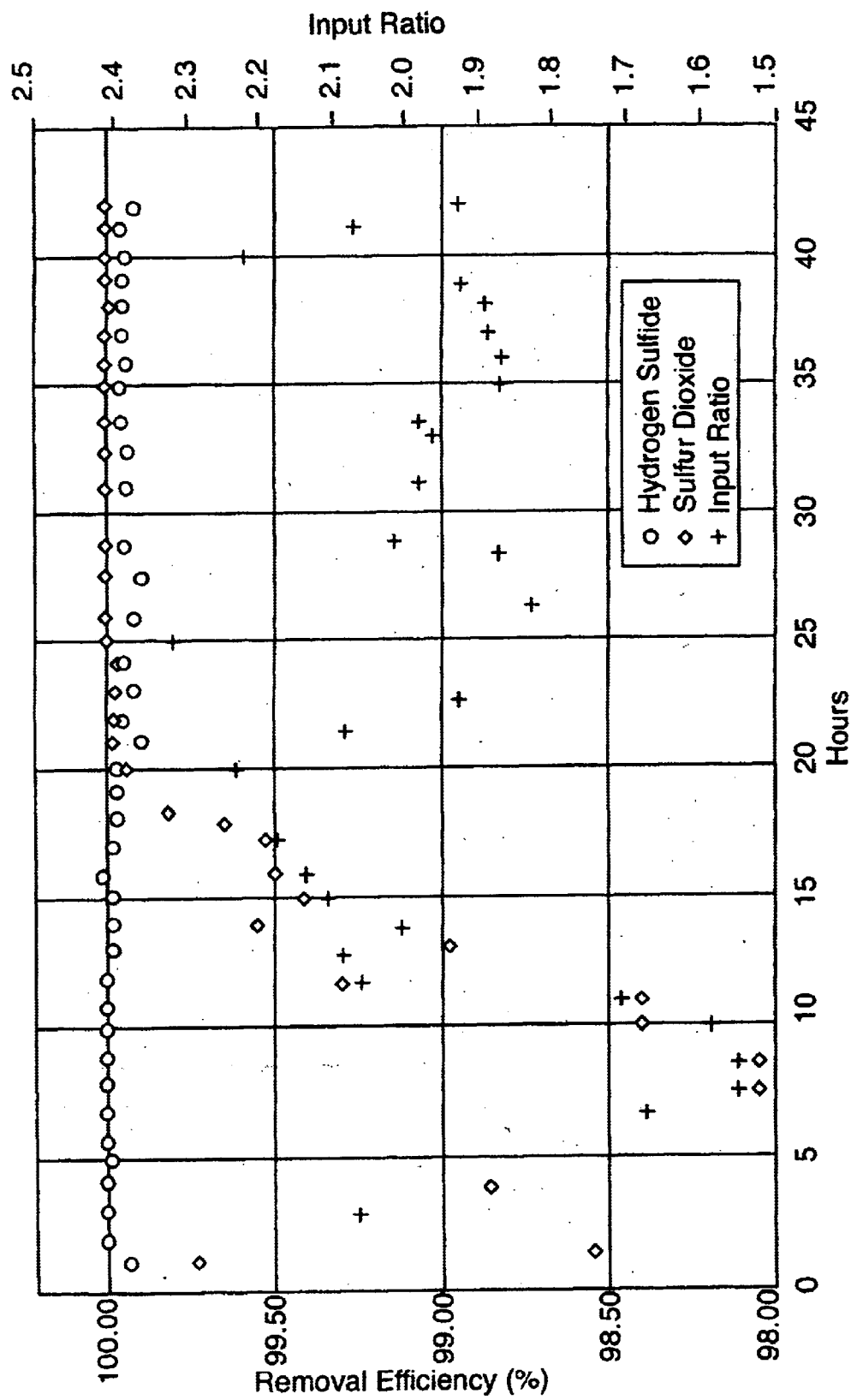
FIG. 4 is a graphical presentation of data generated in an extended run experiment detailed below, showing the removal of efficiency of hydrogen sulfide as a function of time and the removal efficiency of sulfur dioxide as a function of time.

The results obtained were plotted graphically and appear on FIG. 4.

As may be seen from FIG. 4, hydrogen sulfide removal efficiencies were between 99.9 and 100% over a range of input ratios from 1.5:1 to 2.3:1 while sulfur dioxide removal efficiencies were initially low (97 to 98%) but increased with time to 100%. The removal efficiency then remained at 100% for the balance of the run and was independent of the input ratio, which varied between 1.8:1 and 2.3:1 during the balance of the run.

The latter results indicated that the excess sulfur dioxide was reacting with sulfur and water to form complex sulfur-oxide species, giving rise to a flywheel effect whereby it was not necessary to maintain an exact short term 2:1 stoichiometry of the input gases in order to achieve 100% removal of both gases from a gas stream.

Example 3

This Example illustrates the formation of complex sulfur-oxide species.

An experiment was carried out in an autoclave at 135° C. and 22 psig with continuous stirring of quinoline. 12 vol % $H_2S$ and 6 vol % $SO_2$ in a nitrogen carrier were fed to the reactor for 8 hours per day. After the day 10 results were obtained, sulfur was added to the autoclave to ascertain the effect of high sulfur loadings on the process. No deterioration was detected.

The results obtained are shown in Table V below:

TABLE V

Formation of Complex Sulfur Species

| ITEM | DAY 5 | DAY 6 | DAY 7 | DAY 10 | ADDED S |
|---|---|---|---|---|---|
| ION ANALYSIS: |  |  |  |  |  |
| WT % $SO_4^{2-}$ | 1.2 | 1.5 | 1.8 | 2.5 | 0.43 |
| WT % $S_2O_3^{2-}$ | 0 | 0 | 0 | 0 | 0 |
| WT % POLYTHIONATES | 0 | 0 | 3.8 | 3.2 | N/A |
| HPLC ANALYSIS: |  |  |  |  |  |
| WT % QUINOLINE | 75.6 | 68.8 | 66.6 | 53.4 | 8.1 |
| WT % SULFUR | 17.4 | 22.8 | 29.7 | 34 | 75.6 |
| TOTAL WT % | 93 | 91.6 | 96.3 | 87.4 | 81.6 |
| ELEMENTAL ANALYSIS: |  |  |  |  |  |
| WT % TOTAL N | 8.8 | 7.3 | N/A | N/A | N/A |
| WT % TOTAL S | 17.2 | 24.9 | N/A | N/A | N/A |
| TOTAL WT % | 97.1 | 92.2 | N/A | N/A | N/A |

Example 4

This Example illustrates the formation of a scavenger medium for removal of hydrogen sulfide form a gas stream.

In a laboratory experiment, a scavenger medium was prepared using 1 liter of quinoline (7.75 moles) by carrying out the following sequential steps:

(i) adding hydrogen sulfide and sulfur dioxide in stoichiometric ratio (Stage 1);

(ii) adding sulfur dioxide to the resulting mixture of organic medium, sulfur, and water until there was a breakthrough of sulfur dioxide in the off-gas (Stage 1A);

(iii) adding hydrogen sulfide to the scavenger medium prepared in steps (i) and (ii) (Stage 1B);

(iv) repeating steps (i) to (iii) (Stages 2, 2A, 2B).

The concentration of materials added, sulfur production and $H_2S$ adsorption capacity at the various stages of the two experiments are set forth in Table VI below.

To a fresh one liter batch of quinoline, the total amount of $H_2S$ or $SO_2$ initially added in stages 1 and 2 was added in a third experiment (stage 3) followed by addition of sulfur dioxide (stage 3A). The concentration of materials added, sulfur production and $H_2S$ adsorption capacity at various stages of this further experiment are set forth in Table VI below:

TABLE VI

| Stage | OM Moles | $H_2S$ Added Moles | $SO_2$ Added Moles | Moles S Produced | Unused H2S CAP (MOLES) |
|---|---|---|---|---|---|
| 1 | 7.75 | 1.20 | 0.65 | 1.80 | 0.08 |
| 1A | 7.75 | 0.00 | 0.80 |  | 1.68 |
| 1B | 7.75 | 1.20 | 0.00 | 1.80 | 0.4 |
| 2 | 7.75 | 1.06 | 0.65 | 1.59 | 0.63 |
| 2A | 7.75 | 0.00 | 1.04 |  | 2.7 |
| 2B | 7.75 | 2.40 | 0.00 | 3.57 | 0.3 |
| Total | 7.75 | 5.86 | 3.14 | 8.77 |  |
| 3 | 7.75 | 2.30 | 1.30 | 3.45 | 0.30 |
| 3A | 7.75 | 0.00 | 2.10 |  | 4.50 |
| Total | 7.75 | 2.30 | 3.40 | 3.45 | 4.50 |

The results of stages 3 to 3A demonstrate that the loadings of hydrogen sulfide and sulfur dioxide achieved in stages 1 and 2 sequentially can be achieved quatitatively in a single step.

In addition, an experiment was carried out in which a 1:1 mole ratio mixture of hydrogen sulfide and sulfur dioxide was fed into one liter of quinoline (7.75 moles). 2.6 moles of each gas was added and completely absorbed.

A further experiment was carried out in the same quinoline sample and a further 2.0 moles of hydrogen sulfide and 3.8 moles of sulfur dioxide were added in a roughly 1:2 mole ratio and were completely absorbed, before sulfur dioxide started to breakthrough in the off gas towards the end of the experiment.

The total moles of gases added during these experiments were:

$H_2S$ 4.6
$SO_2$ 6.4
Excess $SO_2$ 4.1

On a weight weight basis, these results show that 1000 liters (or kilograms) of scavenger (approximately 220 gallons) will remove 180 kg of hydrogen sulfide from the gas being sweetened. A bubble column 4 ft. in diameter by 20 ft. high, containing 1600 gallons of scavenger, will remove about 1300 kg of hydrogen sulfide before it requires replacement.

SUMMARY OF DISCLOSURE

In summary of this disclosure, the present invention provides processes for the removal of hydrogen sulfide from gas stream using the Claus process reaction with sulfur dioxide to form sulfur in a liquid process employing a reaction medium comprising quinoline or other non-aqueous Lewis bases with $pK_b$ values from about 6 to about 11. Modifications are possible within the scope of this invention.

What we claim is:

1. A reaction medium for removing hydrogen sulfide from a gas stream, which comprises:
    a non-aqueous Lewis base having a $pK_b$ value of about 6 to about 11, sulfate species and polythionate species, said reaction medium exhibiting no sulfur dioxide vapor pressure and having the capacity to absorb hydrogen sulfide from a gas stream and to react with absorbed hydrogen sulfide.

2. The reaction medium of claim 1 wherein said sulfate and polythionate species are provided by the steps of:
    (a) reacting hydrogen sulfide and sulfur dioxide in said non-aqueous Lewis base to form sulfur and water in accordance with equation:

$$2H_2S+SO_2 \rightarrow 3S+2H_2O$$

(b) reacting the reaction medium resulting from step (a) with sulfur dioxide.

3. The reaction medium of claim 2 wherein said steps are carried out by:
    feeding a gas stream containing said hydrogen sulfide and sulfur dioxide through a body of said non-aqueous Lewis base to form sulfur and water in accordance with said equation until there is formed a substantial and required amount of sulfur, and, subsequently
    feeding a gas stream containing sulfur dioxide to said body of Lewis base for no longer than there is a significant detectable amount of sulfur dioxide in an off-gas stream from the body of non-aqueous base.

4. The reaction medium of claim 1 wherein said sulfate and polythionate species are provided by the step of:
    reacting hydrogen sulfide and sulfur in said non-aqueous Lewis base in the presence of a stoichiometric excess of sulfur dioxide.

5. The reaction medium of claim 4 wherein said step is carried out by:
    feeding a gas stream containing said hydrogen sulfide and stoichiometric excess of sulfur dioxide through a body of said non-aqueous Lewis base for no longer than there is a significant detectable amount of sulfur dioxide in an off-gas stream from the body of non-aqueous Lewis base.

6. The reaction medium of claim 5 wherein said gas stream contains a mole ratio of hydrogen sulfide to sulfur dioxide of 1:1 to about 1:2.

7. The reaction medium of claim 1 wherein said non-aqueous Lewis base is quinoline.

8. A process for forming a reaction medium useful for the removal of hydrogen sulfide from a gas stream, which comprises:
    reacting hydrogen sulfide and sulfide dioxide in a non-aqueous Lewis base having a $pK_b$ value of about 6 to about 11 to form sulfur and water in accordance with the equation:

$$2H_2S+SO_2 \rightarrow 3S+2H_2O \text{ and,}$$

either subsequently or simultaneously, reacting sulfur dioxide in excess of the stoichiometry of the equation with said non-aqueous Lewis base, to provide a reaction medium containing sulfate and polythionate species.

9. The process of claim 8 wherein said reaction with said stoichiometric excess of sulfur dioxide is effected subsequent to completion of the reaction of hydrogen sulfide and sulfur dioxide.

10. The process of claim 9 which is effected by:
    feeding a gas stream containing said hydrogen sulfide and sulfur dioxide through a body of said non-aqueous Lewis base to form sulfur and water in accordance with said equation until there is formed a substantial amount of sulfur, and, subsequently
    feeding a gas stream containing sulfur dioxide to said body of Lewis base for no longer than there is a significant detectable amount of sulfur dioxide in an off-gas stream from the body of non-aqueous Lewis base.

11. The process of claim 8 wherein said reaction with said stoichiometric excess of sulfur dioxide is effected simultaneously with the reaction of hydrogen sulfide and sulfur dioxide.

12. The process of claim 11 which is effected by:
    feeding a gas stream containing hydrogen sulfide and a stoichiometric excess of sulfur dioxide through a body of non-aqueous Lewis base for no longer than there is a significant detectable amount of sulfur dioxide in an off-gas stream from the body of non-aqueous Lewis base.

13. The process of claim 8 wherein said non-aqueous Lewis base is quinoline.

* * * * *